United States Patent [19]
Toews

[11] Patent Number: 5,110,047
[45] Date of Patent: May 5, 1992

[54] VANE-TYPE NOZZLE(S) FOR VARYING THE MAGNITUDE AND DIRECTION OF A THRUST VECTOR, AND METHODS OF OPERATING SAME

[75] Inventor: Hans G. Toews, East Aurora, N.Y.
[73] Assignee: Moog Inc., East Aurora, N.Y.
[21] Appl. No.: 474,744
[22] PCT Filed: Aug. 21, 1989
[86] PCT No.: PCT/US89/03602
§ 371 Date: Mar. 20, 1990
§ 102(e) Date: Mar. 20, 1990
[87] PCT Pub. No.: WO89/12741
PCT Pub. Date: Dec. 28, 1989
[51] Int. Cl.⁵ .............................. B64C 15/02
[52] U.S. Cl. .................... 239/11; 239/265.19; 239/265.35; 239/265.37; 60/230
[58] Field of Search ............ 239/265.11, 265.19, 239/265.33, 265.35, 265.37, 451, 455, 587; 60/230, 271

[56] References Cited

U.S. PATENT DOCUMENTS

| | | |
|---|---|---|
| 2,366,264 | 1/1945 | James . |
| 2,799,989 | 7/1957 | Kappus . |
| 3,302,890 | 2/1967 | Silver . |
| 3,304,865 | 2/1967 | Gungle . |
| 4,641,782 | 2/1987 | Woodward ............ 239/265.29 |
| 4,763,840 | 8/1988 | Madden . |
| 4,798,328 | 1/1989 | Thayer et al. ............ 239/265.19 X |
| 4,821,979 | 4/1989 | Denning et al. . |

FOREIGN PATENT DOCUMENTS 874427 8/1961 United Kingdom .

*Primary Examiner*—Andres Kashnikow
*Assistant Examiner*—William Grant
*Attorney, Agent, or Firm*—Sommer, Oliverio & Sommer

[57] ABSTRACT

An adjustable converging-diverging nozzle (10) includes a body (11) having a flow passageway (14) therethrough. The passageway is configured to define an entrance section (18), a narrowed throat section (19), and an exit section (20). Two opposing vane members (12,13) are pivotally mounted on the body. Each vane member has a first surface (33,33') facing into the passageway to form a movable wall portion of the throat section. Each first surface is eccentric to the pivotal axis (38,38') of the associated vane member. A pair of actuators (42,43) are mounted on the body for selectively varying the angular positions of the associated vane members. The vane members may be moved to a closed position to reduce the orifice area of the throat section to zero, or may be moved to other angular positions to vary the magnitude and/or direction of the thrust vector of hot gas discharged through the nozzle. The invention also provides an improved method of operating the nozzle by selectively moving the vane member(s).

12 Claims, 4 Drawing Sheets

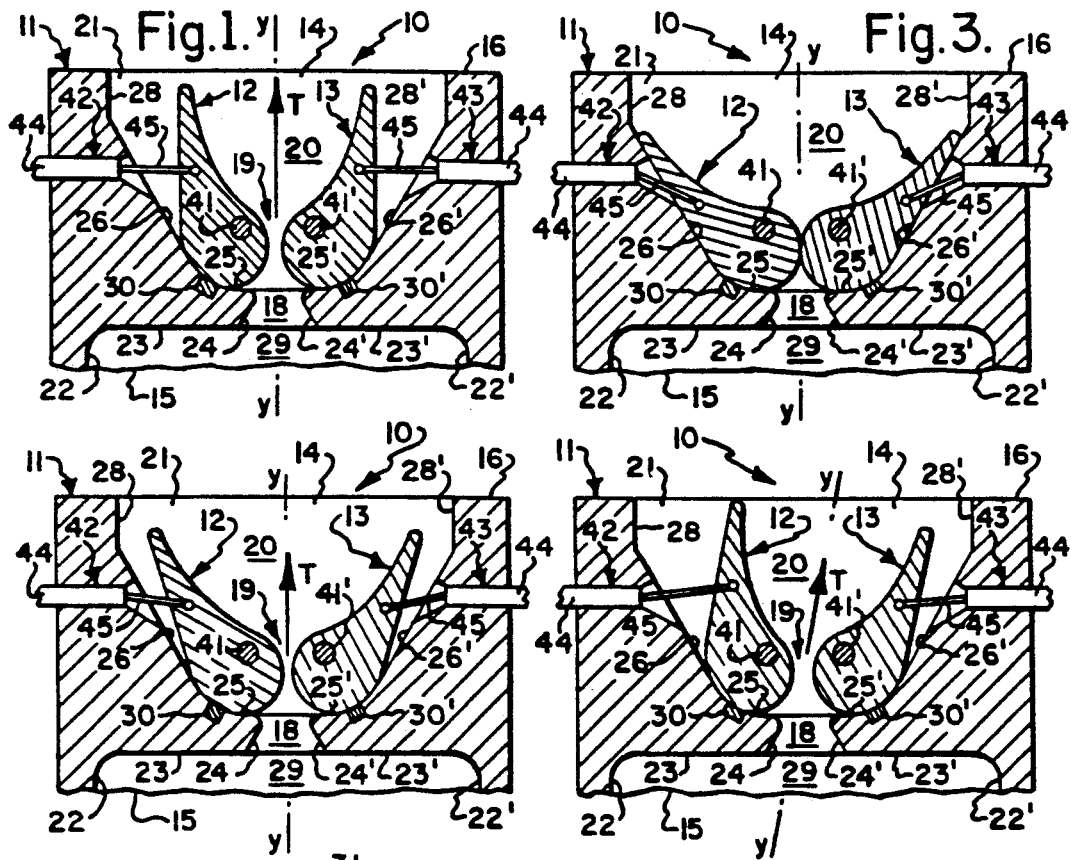
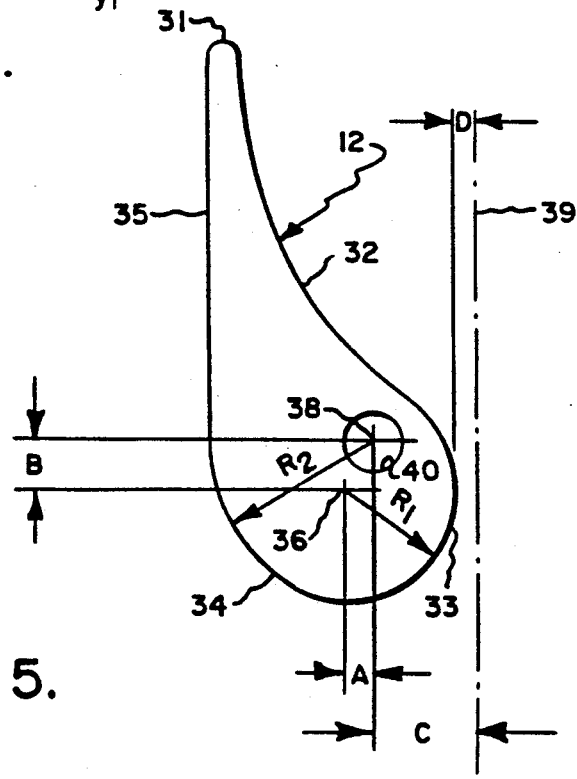

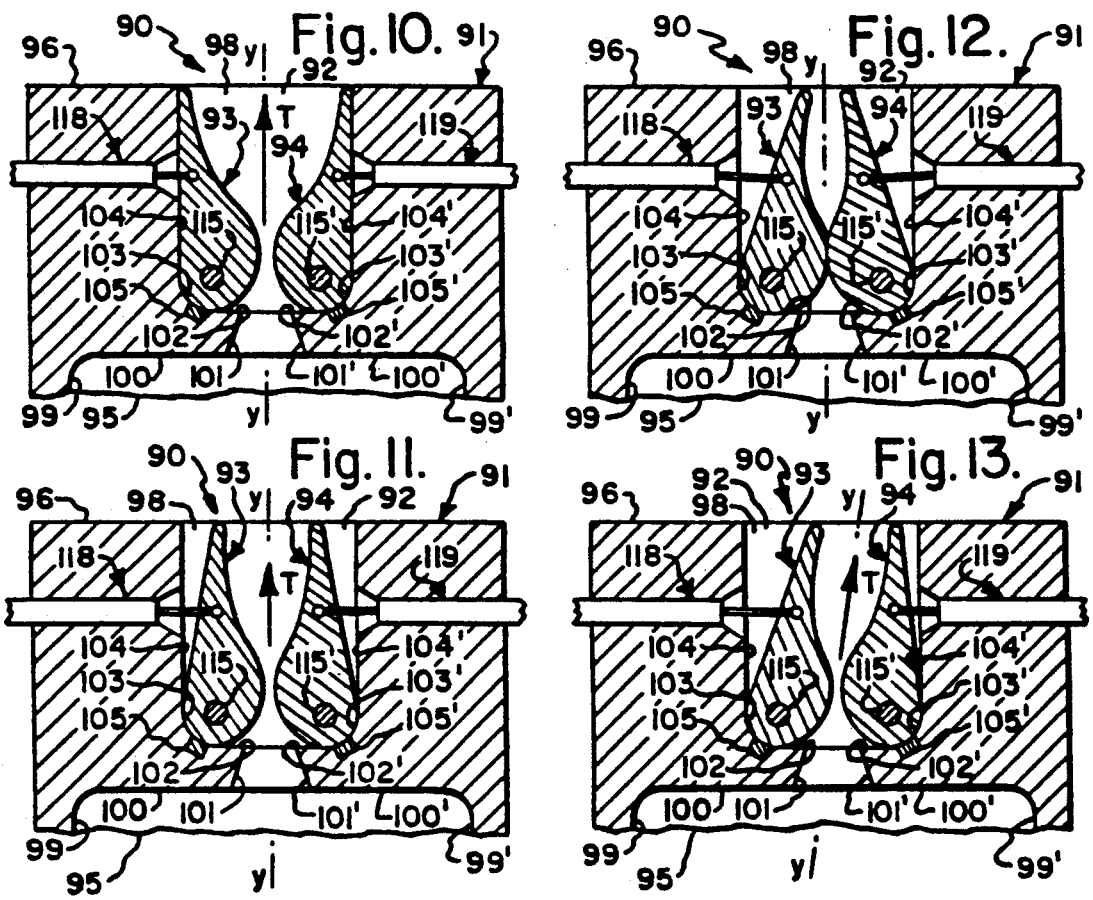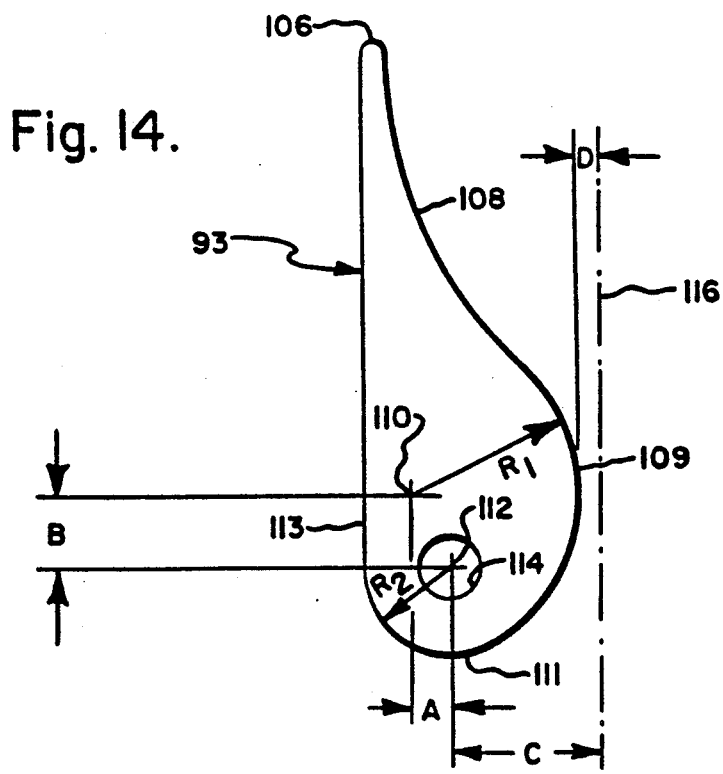

VANE-TYPE NOZZLE(S) FOR VARYING THE MAGNITUDE AND DIRECTION OF A THRUST VECTOR, AND METHODS OF OPERATING SAME

TECHNICAL FIELD

This invention relates generally to the field of nozzles through which a fluid jet is discharged, and, more particularly, to various forms of improved vane-type nozzles for selectively controlling the magnitude and direction of the thrust vector of hot gas discharged therethrough, and to improved methods of controlling the operation of such nozzles.

BACKGROUND ART

Converging-diverging nozzles are commonly used to discharge a fluid, typically a gas, to produce a fluid jet which, in turn, creates thrust. For example, such a fluid jet may be used to control the attitude of an airborne vehicle.

Such nozzles typically have a converging entrance section, a narrowed throat section, and a diverging exit section. Each of these sections is typically of fixed dimension and proportion, and the flow of fluid is controlled by an upstream valve having relatively-slidable parts or small-area orifices. In some applications, contaminants in the hot gas, possibly molten aluminum, may foul these sliding parts and/or orifices.

Accordingly, it would be generally desirable to provide an improved thruster nozzle which is relatively insensitive to contaminants in the discharged fluid, which avoids relatively-sliding parts and small orifices, which is generally self-cleaning, and which affords the capability of selectively varying the flow therethrough at the throat.

DISCLOSURE OF THE INVENTION

The present invention broadly provides various forms of improved vane-type nozzles, and various accompanying forms of operating such nozzles.

With parenthetical reference to the corresponding parts, portions or surfaces of the first embodiment shown in FIGS. 1-5 for purposes of illustration, the invention, in one aspect, provides an improved adjustable nozzle (e.g., 10), which broadly comprises: a body (e.g., 11) having a flow passageway (e.g., 14) therethrough, the passageway being configured to define a converging entrance section (e.g., 18), an narrowed throat section (e.g., 19) and a divergent exit section (e.g., 20); at least one vane member (e.g., 12 or 13) pivotally mounted on the body, each vane member having a first surface (e.g., 33 or 33') facing into the passageway to form a movable wall portion of the throat section, each first surface being eccentric to the pivotal axis (e.g., 38 or 38') of the associated vane member; and an actuator (e.g., 42 or 43) mounted on the body and operable to selectively vary the angular position of the associated vane member relative to the body; whereby each actuator may be selectively operated to controllably vary the orifice area of the throat section. In some cases, the position of a single vane member may be selectively varied to change the magnitude and direction of a thrust vector (i.e., T) discharged therethrough. In other cases, the improved nozzle may have two opposed vane members, and the positions of these may be varied conjunctively or independently of one another, as desired, to vary the magnitude and direction of the thrust vector.

In another aspect, the invention provides an improved method of varying the orifice area of such a nozzle, which method comprises the steps of: providing a body (e.g., 11) with a flow passageway (e.g., 14) therethrough, this passageway having an entrance section (e.g., 18), a narrowed throat section (e.g., 19) and an exit section (e.g., 20); providing a vane member (e.g., 12) to have a first surface (e.g., 33) position eccentrically to a pivotal axis (e.g., 38); mounting the vane member on the body for pivotal movement about the axis such that the first surface forms a movable wall portion of the throat section; and controllably varying the angular position of the vane member relative to the body; thereby to selectively vary the orifice area of the throat section. In some cases, two opposed vane members may be mounted on the body so as to form opposing movable wall portions. These vane members may be moved simultaneously in opposite angular directions to vary only the magnitude of the thrust vector, leaving its direction unchanged, or may be moved independently of one another to vary both the magnitude and direction of the thrust vector. In other cases, the position of a single vane member may be varied to alter the magnitude and direction of the thrust vector.

Accordingly, the general object of the invention is to provide an improved vane-type nozzle having a selectively-variable orifice area.

Another object is to provide an improved method of operating a vane-type nozzle so as to selectively vary the magnitude and/or direction of the thrust vector of gas discharged therethrough.

Another object is to provide an improved nozzle which is self-cleaning, and therefore tolerant of metal-contaminated propellants.

These and other objects and advantages will become apparent from the foregoing and ongoing written specification, the drawings, and the appended claims.

BRIEF DESCRIPTION OF THE DRAWINGS

FIG. 1 is a schematic fragmentary transverse vertical sectional view of a first form of the inventive vane-type nozzle, this view showing the two vane members as being in symmetric respective angular positions at which the orifice area of the throat section is a maximum and the thrust vector is vertical.

FIG. 2 is a view generally similar to FIG. 1, but shows the upper portions of the vane members as having been moved from the position shown in FIG. 1 in opposite angular directions toward one another through equal arc distances to reduce the orifice area of the throat section, while maintaining the direction of the thrust vector.

FIG. 3 is a view generally similar to FIGS. 1 and 2, but shows the upper portions of the vane members as having been moved further in such opposite angular directions to close the throat section.

FIG. 4 is a view generally similar to FIGS. 1-3, but showing the upper portions of the vane members as having been rotated independently to asymmetric positions relative to the body to vary the magnitude and direction of the thrust vector.

FIG. 5 is an enlarged transverse vertical sectional view of the left vane member shown in FIGS. 1-4.

FIG. 10 is a schematic fragmentary transverse vertical sectional view of a third form of the improved vane-type nozzle, this view showing the two vane members as being in symmetrical positions relative to the body at which the magnitude of the thrust vector is a maximum.

FIG. 11 is a view generally similar to FIG. 10, but shows the upper portions of the vane members as having been rotated in opposite directions toward one another from the position shown in FIG. 10 such that the direction of the thrust vector is still vertical but of reduced magnitude.

FIG. 12 is a view generally similar to FIGS. 10 and 11, but shows the upper portions of the vane members as having been rotated further toward one another to close the throat section.

FIG. 13 is a view generally similar to FIGS. 10-12, but shows the upper portions of the vane members as having been moved to positions to vary the direction and magnitude of the thrust vector.

FIG. 14 is a fragmentary enlarged vertical sectional view of the left vane member shown in FIGS. 10-13.

MODE(S) OF CARRYING OUT THE INVENTION

Figure 6:
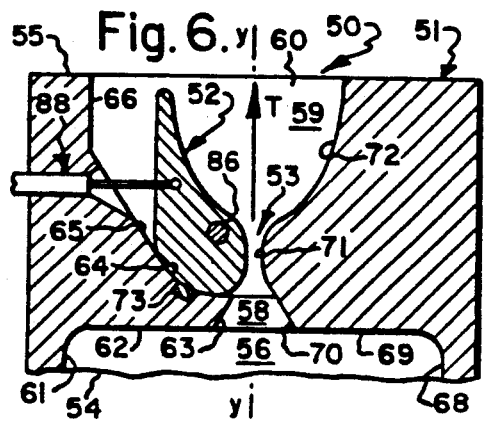
FIG. 6 is a schematic fragmentary transverse vertical sectional view of a second form of the inventive vane-type nozzle, this view showing a single vane member as being in a position such that the thrust vector will be vertical.
Figure 7:
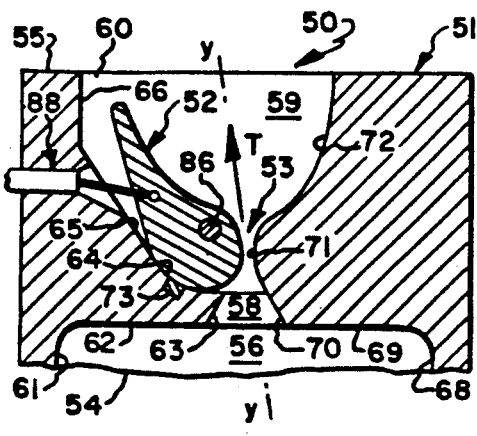
FIG. 7 is a view generally similar to FIG. 6, but shows the upper portion of the vane member as having been rotated in a counter-clockwise direction from the position shown in FIG. 6 to vary the direction and magnitude of the thrust vector of gas discharged therethrough.

At the outset, it should be clearly understood that like reference numerals are intended to identify the same structural elements, portions or surfaces consistently throughout the several drawing figures, as 'such elements, portions or surfaces may be further described or explained by the entire written specification of which this detailed description is an integral part. Unless otherwise indicated, the drawings are intended to be read (e.g., arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis or rotation, as appropriate.

Turning now to the drawings, this invention provides various forms of improved vane-type converging-diverging jet nozzles, and methods of operating same. In the following description and in the accompanying drawings, the thrust vector of gas discharged through the improved nozzle is along axis y—y. A first preferred form of the improved nozzle is shown in FIGS. 1-5, a second in FIGS. 6-9, a third in FIGS. 10-14, and a fourth in FIGS. 15-17. While each of these embodiments may have certain element(s) in common, all four forms are specifically different. Hence, these four embodiments will be described seriatim herebelow.

FIRST EMBODIMENT (FIGS. 1-5)

Referring initially to FIGS. 1-4, the first form of the improved adjustable nozzle is generally indicated at 10. Nozzle 10 is shown as broadly including a body 11, and a pair of transversely-spaced left and right vane members 12, 13, respectively.

The body is shown as being provided with a vertical through-passageway 14 extending between its lower or inner side 15 and its upper or outer side 16. This passageway is generally configured as a converging-diverging nozzle, and has a lower entrance section 18, an intermediate narrowed throat section 19, and an upper exit section 20. More particularly, the passageway is elongated along a vertical plane perpendicular to the plane of the paper, and extends between a pair of longitudinally-spaced planar vertical end walls, one of which is indicated at 21. The other end wall is not shown simply because the various drawing figures are taken through an intermediate portion of the length of the nozzle assembly, but is substantially a mirror image of end wall 21.

When seen in transverse cross-section (FIGS. 1-4), the body surface forming the longitudinally-extending left wall of this passageway is shown as sequentially including: a rightwardly-facing planar vertical surface 22, a downwardly-facing horizontal surface 23, a downwardly- and rightwardly-facing inclined planar surface 24, an upwardly- and rightwardly-facing circularly-segmented concave surface 25, an upwardly- and rightwardly-facing inclined planar surface 26 tangentially joining the left margin of surface 25, and a rightwardly-facing planar vertical surface 28 continuing upwardly therefrom to join upper surface 16. The body surface forming the opposite right wall of the passageway is a mirror image of the left wall, and sequentially includes: a leftwardly-facing planar vertical surface 22', a downwardly-facing horizontal surface 23', a downwardly- and leftwardly-facing inclined planar surface 24', an upwardly- and leftwardly-facing circularly-segmented concave surface 25', an upwardly- and leftwardly-facing inclined planar surface 26' tangentially joining the right margin of surface 25', and a leftwardly-facing planar vertical surface 28' continuing upwardly therefrom to join upper surface 16. Thus, wall surfaces 24,24' define the horizontally-elongated entrance section 18 therebetween. Wall surfaces 22,22',23,23' face into an inner chamber 29 which is adapted to be provided with, or otherwise contain, a pressurized hot gas or equivalent, which gas is to be selectively discharged upwardly through the nozzle-like passageway to the outer ambient atmosphere. A pair of longitudinally-extending U-shaped recesses are shown as extending normally into the body from concave surfaces 25,25', respectively, to receive and accommodate a pair of carbon seal strips 30,30', respectively, the outer surfaces of which wipingly and sealingly engage the proximate surfaces of vane members 12,13.

Vane members 12,13 are structurally identical, albeit one is arranged as a mirror image of the other. Because of this, only the left vane member will be specifically described. As best shown in FIG. 5, vane member 12 is specially-configured and is horizontally-elongated along an axis perpendicular to the plane of the paper. When viewed in transverse cross-section, this vane member is seen as being sequentially bounded by: an uppermost semi-circular convex tip surface 31, a parabolically-segmented concave surface 32 extending downwardly and rightwardly from the right margin of tip surface 31, a circularly-segmented convex surface 33 tangentially joining surface 32, another circularly-segmented convex surface 34 tangentially joining the left margin of surface 33, and a leftwardly-facing planar vertical surface 35 continuing upwardly therefrom to join the left margin of tip surface 31.

In one particular form of this first embodiment, surface 33 is generated about point 36, has a radius $R_1$ of 0.329 inches [8.36 mm], and occupies an arc distance of 168°36′. Surface 34 is generated about point 38, has a radius $R_2$ of 0.499 inches [12.67 mm], and occupies an arc distance of 60°0′. Points 36,38 are separated by a horizontal distance (i.e., dimension A) of 0.085 inches [2.15 mm], and by a vertical distance (i.e., dimension B) of 0.147 inches [3.73 mm]. The horizontal distance (i.e., dimension C) between axis 38 and the vertical centerline plane between the nozzles, this plane being represented by the vertical dashed line 39, is 0.317 inches [8.05 mm], and the horizontal distance (i.e., dimension D) between surface 33 and such centerline plane is 0.073 inches [1.86 mm] when the vane member is in the position shown in FIG. 5. Thus, when both vane members are in the positions shown in FIGS. 1 and 5 (i.e., with vane member surfaces 35,35′ being vertical), the transverse horizontal width of the throat portion will be twice dimension D, or 0.146 inches [3.71 mm].

Vane member 12 is provided with a longitudinally-extending horizontal through-hole 40 concentric with axis 38 to receive and accommodate a pivot pin 41 (FIGS. 1–4). Of course, the right vane member 13 is structurally identical to, and is arranged as a mirror image of, the left vane member. Because vane members 12,13 are structurally identical, a complete description of the right vane member is not necessary and will be omitted, it being understood that the prime of the same reference numerals used to identify the various parts, portions or surfaces of the left vane member are used to identify the corresponding parts, portions or surfaces of the right vane member. The two vane members are operatively mounted on the body, as shown in FIGS. 1–4, such that seal strips 30,30′ sealingly and wipingly engage the facing proximate vane member surfaces 34,34′, respectively.

Left and right actuators 42,43 are mounted on the body, and operatively engage the left and right vane members 12,13, respectively. Each actuator is shown as including a Bourdon cable having its outer cylindrical sheath 44 mounted fast to the body and having the distal end of its extensible and retractable rod-like cable portion 45 engaging the associated vane member at a position spaced vertically above the axis of rotation. Actuators 42,43 also include a suitable means or mechanism (not shown) for selectively moving each cable relative to its sheath to selectively vary the position of the associated vane member relative to the body. Alternatively, some other type of actuator (i.e., a fluid-powered piston-and-cylinder, a motor, etc.) and associated linkage might be substituted therefor. Actuators 42,43 may be operated conjunctively and simultaneously, or independently of one another, as desired.

FIG. 1 depicts the vane members as being arranged such that vane member surfaces 35,35′ are vertical, as again shown in FIG. 5. As previously noted, when vane members are in this position, the horizontal transverse width of the throat section 19 formed between the facing portions of surfaces 33,33′ will be twice dimension D, or 0.146 inches [3.71 mm]. Thus, hot gas in inner chamber 29 may be discharged upwardly through the nozzle along a line bisecting surfaces 33,33′, as represented by vertical thrust vector T.

FIG. 2 shows the actuators as having been operated conjunctively so that the vane members have been moved from the positions shown in FIG. 1 through equal arc distances, but in opposite angular directions. More particularly, left vane member 12 is shown as having been rotated from the position shown in FIG. 1 in a counterclockwise direction through an angle of about 15°, while right vane member 13 has been simultaneously rotated in a clockwise direction through the same angle. Such rotation of the vane members has caused other facing portions of cam-like surfaces 33,33′, which are respectively generated about axes eccentric to the axes of pins 41,41′, to move closer to one another. This has the effect of reducing the transverse width of the elongated narrowed rectangular throat section, and, at the same time, pivotally enlarging the transverse width of the exit section. However, because both vane members have been moved through equal arc distances from the positions shown in FIG. 1, the thrust vector T is still vertical, but of reduced magnitude due to the reduction in the orifice area of the throat section.

FIG. 3 depicts the vane members as having been moved simultaneously through further equal arc distances in the same opposite directions such that still other portions of eccentrically-mounted surfaces 33,33′ engage one another in line contact to close the throat section, thereby preventing hot gas from being discharged therethrough. In this situation, vane member surfaces 35,35′ are arranged to engage, or at least closely face, body surfaces 26,26′.

FIG. 4 depicts the vane members has having been moved independently of one another through different arc distances to asymmetric positions relative to the body such that the trust vector T, which bisects surfaces 35,35′, is directed upwardly and rightwardly.

Thus, the vane members may be moved cooperatively, either together or independently of one another, to selectively vary the magnitude and/or direction of the thrust vector of hot gas discharged through the passageway.

SECOND EMBODIMENT (FIGS. 6–9)

Referring now to FIGS. 6–9, the second form of the improved converging-diverging nozzle, generally indicated at 50, is shown as including a body 51, and a single vane member 52.

Body 51 is again shown as being provided with a vertical through-passageway 53 extending between its lower or inner side 54, and its upper or outer side 55. The passageway is again configured as a converging-diverging nozzle, and includes a lower entrance section 56, an intermediate narrowed throat section 58, and an upper exit section 59. As with the first embodiment, passageway 53 is elongated along a vertical plane perpendicular to the plane of the paper, and extends between a pair of longitudinally-spaced end walls, one of which is indicated at 60.

However, unlike the first embodiment which had two movable vane members, this second form has only one. To accommodate this, the facing side surfaces of the passageway are configured differently. The left wall is generally similar to the first embodiment, and is shown in transverse cross-section as sequentially including: a rightwardly-facing planar vertical surface 61, a downwardly-facing planar horizontal surface 62, a rightwardly- and downwardly-facing inclined planar surface 63 forming a portion of the entrance section 56, a rightwardly- and upwardly-facing circularly-segmented concave surface 64, and upwardly- and rightwardly-facing planar inclined surface 65 tangentially joining the left margin of surface 64, and a rightwardly-facing planar vertical surface 66 continuing upwardly therefrom to join outer surface 55. The passageway right wall differs from that shown in FIGS. 1-5, and specifically includes: a leftwardly-facing planar vertical surface 68, a downwardly-facing planar horizontal surface 69, a downwardly- and leftwardly-facing inclined planar surface 70 forming with left wall surface 63 the entrance section therebetween, a leftwardly-facing convex arcuate surface 71 tangentially joining surface 70 and forming the right wall of the throat section, and an upwardly- and leftwardly-facing parabolically-segmented concave surface 72 tangentially joining surface 71 and continuing upwardly therefrom to join upper surface 55. A longitudinally-extending U-shaped recess extends normally into surface 64 to receive and accommodate a carbon seal strip 73 which sealingly and wipingly engages the facing surface of vane member 52.

In this second form, vane member 52 is specially-configured and horizontally-elongated. When seen in transverse cross-section (FIG. 9), this vane member is sequentially bounded by: an uppermost semi-circular convex tip surface 74, a parabolically-segmented concave surface 75 extending downwardly and rightwardly from the right margin of surface 74, a circularly-segmented first surface 76 of radius $R_1$ generated about point 78 and occupying an arc distance of about 60°, a rightwardly-facing vertical surface 79, a second circularly-segmented surface 80 of radius $R_2$ generated about point 81 and occupying an arc distance of about 80°, a third circularly-segmented convex surface 82 of radius $R_3$ generated about point 83 and occupying an arc distance of about 80°, and a leftwardly-facing planar vertical surface 84 continuing upwardly therefrom to join the left margin of convex tip surface 74. The various adjacent surfaces just described are shown as being in generally-smooth continuous transition. A longitudinally-extending horizontal through-hole 85, concentric with point 83, is provided through the vane member to receive and accommodate a pin 86 (FIGS. 6-8) by which the vane member may be pivotally mounted on the body. A Bourdon cable actuator 88, generally similar to left actuator 42 in the first embodiment, is shown as being operatively arranged to selectively move the vane member to the desired angular position relative to the body.

Figure 8:
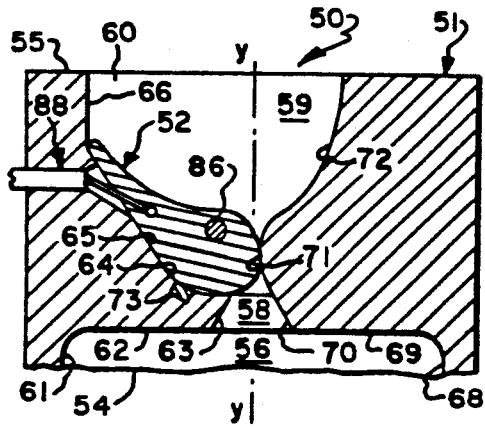
FIG. 8 is a view generally similar to FIGS. 6 and 7, but shows the upper portion of the vane member as having been further rotated in such counter-clockwise direction to close the throat section.
Figure 9:
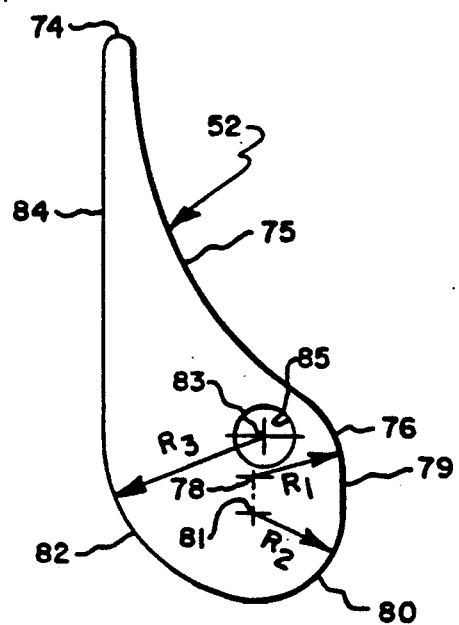
FIG. 9 is an enlarged transverse vertical sectional view of the vane member shown in FIGS. 6-8.

Thus, this second form has only one vane member. To accommodate this configuration, the right wall of the passageway is complimentarily configured to generally simulate the shape of the facing surfaces of the vane member and the left wall, when surface 84 of the vane member is vertical. In FIG. 6, the vane member 52 is shown as being in an angular position at which vane member surface 84 is vertical, as also shown in FIG. 9. In this position, hot gas may be discharged vertically upwardly through the passageway, as represented by thrust vector T. Alternatively, if the vane member is moved from the position shown in FIG. 6 in a counter-clockwise direction to the intermediate position shown in FIG. 7, the magnitude and direction of thrust vector T will change. More particularly, in FIG. 7, the magnitude of the thrust vector is shown as being reduced from that shown in FIG. 6, owing to the fact that vane member surfaces 76,79 have moved closer to the opposing stationary surfaces of the passageway right wall. Moreover, the trust vector, now or reduced magnitude, is shown as being directed upwardly and leftwardly. FIG. 8 depicts the vane member has having been rotated further in a counterclockwise direction from the position shown in FIG. 7, such that a proximate portion of the vane member, this portion being generally arranged between surfaces 79,80, engages the transversely-opposite right wall of the passageway substantially in line contact to close the throat section. This represents a closed condition of the nozzle.

Therefore, this second form differs from the first embodiment in that only one vane member is provided. The omission of the right vane member is accommodated by configuring the right wall of the passageway to generally compliment the facing surfaces of the left wall and the vane member. However, as with the first embodiment, this second form may be operated to selectively vary the magnitude and/or direction of the thrust vector discharged through the passageway.

THIRD EMBODIMENT (FIGS. 10-14)

A third form of the improved nozzle arrangement, generally indicated at 90, is shown in FIGS. 10-14.

In this form, actuator 90 is again shown as broadly including a body 91 provided with a vertical through-passageway 92, and a pair of horizontally-elongated transversely-spaced vane left and right vane members 93,94, respectively, operatively positioned within this passageway. As with the previously-described embodiments, passageway 92 extends between the body lower or inner side 95 and its upper or outer side 96. The passageway is elongated along a vertical plane perpendicular to the plane of the paper, extends between a pair of longitudinally-spaced planar vertical end walls, one of which is indicated at 98, and is transversely bounded by longitudinally-extending left and right side walls. The left side wall is shown as being sequentially bounded by: a rightwardly-facing planar vertical surface 99, a downwardly-facing horizontal planar surface 100, a downwardly- and rightwardly-facing inclined planar surface 101, an upwardly-facing planar horizontal surface 102, an upwardly- and rightwardly-facing concave circularly-segmented quarter-round surface 103, and a rightwardly-facing planar vertical surface 104 continuing upwardly therefrom to join upper surface 96. The right side wall is configured as a mirror image of the left side wall. Because of this, a detailed description thereof will be omitted, it being understood that the prime of the numeral used to identify the previously-described left wall, is used to identify the corresponding surfaces of the right side wall. A longitudinally-extending slot, having a generally U-shaped transverse cross-section, is shown as extending normally into the body from each of concave surfaces 103,103' to receive and accommodate an elongated carbon seal strip 105,105', respectively, which sealingly and wipingly engages the facing surface of the associated vane member. As best shown in FIG. 14, left vane member 93 is specially-configured and horizontally-elongated along an axis extending out of the paper. When seen in transverse cross-section (FIG. 14), this vane member is sequentially bounded by: an uppermost semi-circular convex tip surface 106, an upwardly- and rightwardly-facing concave parabolically-segmented surface 108 extending downwardly from the right margin of tip surface 106, a first convex circularly-segmented surface 109 of radius $R_1$ generated about point 110, a second convex circularly-segmented surface 111 of radius $R_2$ generated about point 112, and a leftwardly-facing planar vertical surface 113 extending upwardly therefrom to join the left margin of tip surface 106. The various adjacent surfaces of the vane member are shown as being in generally-smooth continuous transition. The vane member is further shown as being provided with a longitudinally-extending horizontal through-hole 114, concentric with point 112, to receive and accommodate a pivot pin 115 (FIGS. 10–13) by which the vane member may be rotatably mounted on the body. The right vane member 94 is configured as a mirror image of the left vane member. Since the two vane members are structurally identical to one another, a detailed description of the right vane member will be omitted.

In one particular form of this third vane member, radius $R_1$ is 0.488 inches [12.40 mm] and occupies an arc distance of 107°17', while radius $R_2$ is 0.250 inches [6.35 mm] and occupies an arc distance of 120°0'. Points 110,112 are separated by a horizontal distance (i.e., dimension A in FIG. 14) of 0.119 inches [3.02 mm], and by a vertical distance (i.e., dimension B) of 0.206 inches [5.23 mm]. When the vane member is in the position shown in FIG. 14 (i.e., with surface 113 being vertical), the horizontal distance between point 112 and the centerline 116 between the vane member (i.e., dimension C) is 0.442 inches [11.23 mm], and the horizontal distance between surface 109 and centerline 116 (i.e., dimension D) is 0.073 inches [1.85 mm]. Thus, when both vane members are in this upright position, the transverse width of the throat section is 0.146 inches [3.71 inches]. Left and right Bourdon cable actuators 118,119, generally similar to those previously described, penetrate the body and operatively engage vane members 93,94, respectively. As before, these actuators are arranged to selectively move their associated vane members to desired angular positions relative to the body.

In FIG. 10, vane member surfaces 113,113' are shown as being substantially vertical, such that the orifice area of the throat section will be at its maximum and the direction of the thrust vector (i.e., T) will be substantially vertical. FIG. 11 depicts the vane members as having been rotated relatively toward one another (i.e., in opposite angular directions) through equal arc distances of about 20°, such that the throat section orifice area will be reduced from that shown in FIG. 10. Thus, in this position, the magnitude of the thrust vector will be reduced, but its direction will still be substantially vertical. FIG. 12 depicts the vane members as having been further rotated toward one another in such opposite angular directions until facing portions of vane member surfaces 109,109' engage one another in substantially line contact, thereby closing the throat section and reducing the magnitude of the thrust vector to zero. FIG. 13 depicts the vane the vane members as having been moved to asymmetric respective positions relative to the body at which the thrust vector will be directed upwardly and rightwardly.

Thus, as with the first embodiment, the positions of the two vane members may be selectively varied, either simultaneously or otherwise, to vary the direction and magnitude of the thrust vector. This embodiment has the additional advantage that the ratio of the cross-sectional areas of the throat and exit sections will remain substantially the same at various angular positions of the vane members.

FOURTH EMBODIMENT (FIGS. 15–17)

Figure 15:
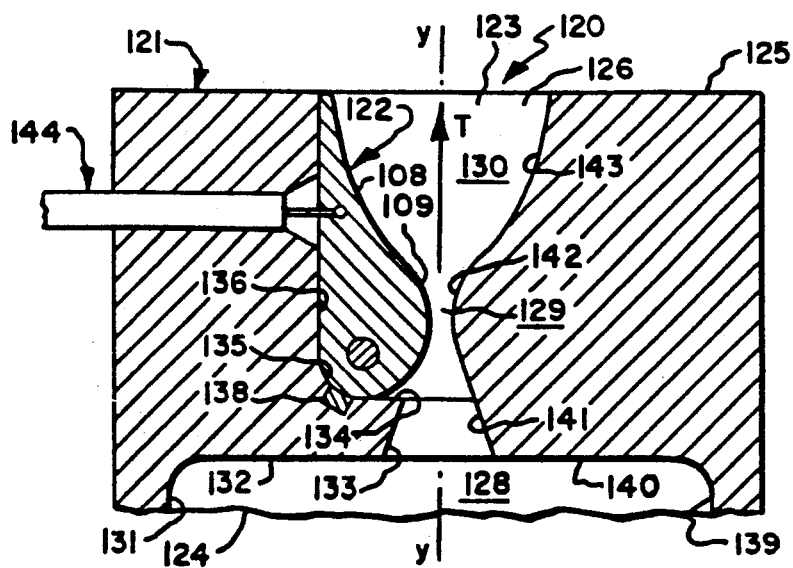
FIG. 15 is a schematic fragmentary vertical sectional view of a fourth form of the improved vane-type nozzle, this view showing the single vane member as being in its fully-opened position.
Figure 16:
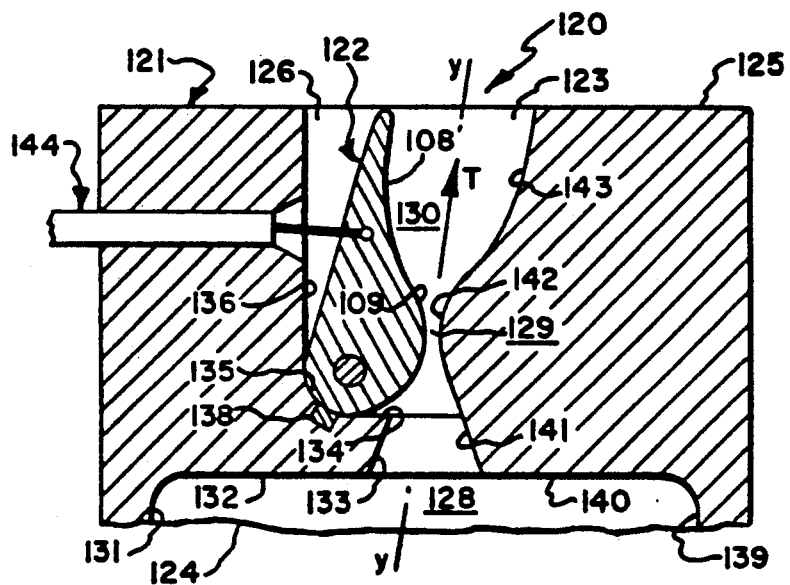
FIG. 16 is a view generally similar to FIG. 15, but shows the vane member as having been moved to an intermediate partially-opened position to vary the magnitude and direction of the thrust vector.
Figure 17:
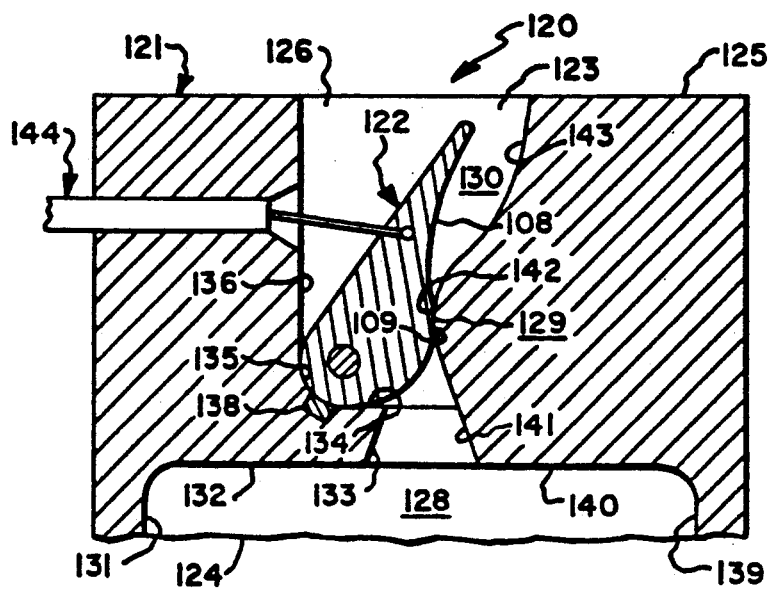
FIG. 17 is a view generally similar to FIGS. 15 and 16, but shows the vane member as having been moved to its fully-closed position.

A fourth form of the improved nozzle arrangement, generally indicated at 120, is shown in FIGS. 15–17 as including a body 121 and a single vane member 122.

Body 121 is again shown as being provide with a vertical through-passageway 123 extending between a lower or inner side 124 and an upper or outer side 125. The passageway is elongated along a vertical plane extending out of the paper, and is bounded by longitudinally-spaced transverse vertical end walls, one of which is indicated at 126. The other end wall does not appear in FIGS. 15–17 simply because these views are taken through an intermediate portion of the structure. The passageway is again configured as an elongated converging-diverging nozzle, and includes a lower entrance section 128, and intermediate narrowed throat section 129, and an upper exit section 130.

In this form, the left and right side walls of the body passageway are asymmetrical. The left wall is shown as including: a rightwardly-facing vertical surface 131, a downwardly-facing horizontal surface 132, a downwardly- and rightwardly-facing inclined planar surface 133, an upwardly-facing horizontal surface 134, and arcuate quarter-round concave surface 135 tangentially joining surface 134, and a rightwardly-facing vertical surface 136 tangentially joining surface 135 and extending upwardly therefrom to join upper surface 125.

Vane member 122 is operatively mounted within the L-shaped recess defined in the left wall by surfaces 134,135 and 136. If desired, vane member 122 may be substantially identical to vane member 93, previously described. Because of this, a detailed description of the vane member 122 will be omitted, it being understood that the same reference numeral will identify the same structure, element or surface previously described. An elongated recess, having a U-shaped transverse cross-section, is shown as extending normally into the body from arcuate surface 135 to receive and accommodate an elongated carbon sealing strip 138, or equivalent, which sealingly and wipingly engages the outer surface of the vane member.

The right wall of the passageway is shown as being sequentially bounded by: a leftwardly-facing vertical surface 139, a downwardly-facing horizontal surface 140, a downwardly- and leftwardly-facing inclined planar surface 141 arranged to face left wall surface 133, and arcuate nose surface 142 proximate the throat section, and an upwardly- and leftwardly-facing parabolically-segmented surface 143 continuing upwardly and rightwardly therefrom to join upper surface 125. Surfaces 141–143 are in generally-smooth continuous transition, one to another. Thus, the right wall is configured to generally simulate the facing surface of the left wall and the vane member, when the vane member is in its vertical position as shown in FIG. 9. In other words, the lower portion of surface 141 is generally symmetrical with left wall surface 133, rounded nose 142 is generally symmetrical with the facing surface of the vane member, and surface 143 is generally symmetrical with vane surface 108.

A Bourdon cable-type actuator 144 penetrates the body and engages the vane member, Hence, this actuator may be selectively operated to controllably vary the angular position of the vane member, as previously described. When the vane member is vertical, as shown in FIG. 15, the orifice area of the throat section will be at its maximum, and, because of the substantially-symmetrical shape of the facing surfaces forming the passageway, the thrust vector T will be substantially vertical. FIG. 16 shows the vane member as having been rotated from the position shown in FIG. 15 in a clockwise direction through an arc distance of about 18°. The effect of this is to move vane member surface 109 toward right rounded surface 142, thereby reducing the orifice area of the throat section. At the same time, the facing surfaces will be generally symmetrical about an axis y—y extending upwardly and rightwardly. Hence, the thrust vector will be directed upwardly and rightwardly, but will be of reduced magnitude as compared with that shown in FIG. 15. FIG. 17 shows the vane member as having been rotated still further in a clockwise direction until vane member surface 109 impinges upon rightward surface 142 substantially in line contact to close the throat section and reduce the magnitude of the thrust vector to zero.

Thus, in this form, the improved vane member may be operated to vary the direction and magnitude of the thrust vector.

MODIFICATIONS

The present invention contemplates that many changes and modifications may be made.

For example, the materials of construction are not deemed critical, and may be selected from any number suitable for the intended purpose. The end walls need not necessarily be vertical, and may be inclined or arcuate, as desired. In either case, the vane member(s) may be moved to various positions to vary the magnitude and direction of the thrust vector discharged through the passageway. In some applications, it may be desirable to provide recesses in the body from the passageway to receive and conceal the vane member(s) when moved to the appropriate angular position(s). If one vane member is employed, the direction of the throat section may be varied in a single quadrant. If two vane members are employed, the direction of the thrust vector may be varied in either or both of two quadrants.

The size, shape and configuration of the vane member(s) may also be changed and modified, either conjunctively or independently of the shape of the opposing wall of the passageway, as appropriate and as desired. For example, the vane member surface forming the exit section need not necessarily be a parabolic segment. In some cases, this surface may be planar or have some other shape or configuration. It is presently preferred that the two facing surfaces of the throat section selectively engage one another in line contact, although this is not invariable. Moreover, the vane members may operated to vary the cross-sectional area of the throat section, without altering the shape and configuration of the exit section. In other cases, the vane member(s) may be joined to the body by means of a web section that flexes to permit the desired angular movement of the associated vane member. Similarly, the nature and type of the sealing strip or member may be changed or varied, as desired.

Accordingly, the invention provides various forms of an improved vane-type nozzle, which is particularly suited to vary the thrust vector of gas discharged therethrough, which has no relatively sliding surfaces directly exposed to the discharged gas, which is self-cleaning, and which is tolerant of contaminant-laden fuels and propellants. The dual vane member embodiments somewhat resemble the "flippers" of a pinball machine. Moreover, each vane member may be partially pressure-balanced. Thus, the invention provides an improved converging-diverging nozzle in which at least one vane member is operatively mounted on a body in a flow passageway therethrough, which vane member(s) may be selectively moved relative to the body to vary the direction and magnitude of the thrust vector of fluid discharged therethrough. At the same time, the improved nozzle obviates the need for an upstream valve to control the flow of gas to the nozzle. Rather, the appropriate flow-regulating valving action is provided directly in the throat section.

Therefore, while several presently-preferred forms of the improved vane-type nozzles have been shown and described, and several modifications and changes thereof discussed, persons skilled in this art will readily appreciate that various additional changes and modifications may be made without departing from the spirit of the invention, as defined and differentiated by the following claims.

I claim:

1. An adjustable nozzle, comprising:
   a body having a flow passageway therethrough, said passageway being configured to define a converging entrance section, a narrowed throat section and a diverging exit section, said body having a surface forming a stationary wall portion of said throat section;
   a vane member pivotally mounted on said body, said vane member having a first surface facing into said passageway to form a movable wall portion of said throat section, said first surface being eccentric to the pivotal access of the associated vane member, said vane member being rotatable about its pivotal axis to an angular position at which said first surface engages said stationary wall portion of said throat section to close said passageway; and
   an actuator mounted on said body and operable to selectively vary the angular position of said vane member relative to said body;
   whereby said actuator may be selectively operated to controllably vary the orifice area of said throat section.

2. An adjustable nozzle as set forth in claim 1 wherein said vane member has a second surface forming a movable wall portion of said exit section.

3. An adjustable nozzle as set forth in claim 2 wherein said second surface tangentially joins said first surface of said vane member.

4. An adjustable nozzle as set forth in claim 2 wherein said second surface is substantially parabolic when viewed in transverse cross-section.

5. An adjustable nozzle as set forth in claim 1 wherein said vane member is partially balanced against the pressure of a fluid in said entrance section.

6. An adjustable nozzle as set forth in claim 1 wherein said movable wall portion is arranged to selectively engage said stationary wall portion in line contact to close said throat section.

7. An adjustable nozzle as set forth in claim 1 wherein said first surface is configured as a circular segment, when viewed in transverse cross-section.

8. An adjustable nozzle as set forth in claim 7 wherein said first surface occupies an arc distance of about 180°.

9. An adjustable nozzle as set forth in claim 7 wherein said first surface is cylindrical.

10. A method of varying the orifice area of a nozzle, comprising the steps of:
providing a body with a flow passageway therethrough, said passageway having a converging entrance section, a narrowed throat section, and a diverging exit section, said body having a surface providing a stationary wall portion of said throat section;
providing a vane member to have a first surface positioned eccentrically to a pivotal axis;
mounting said vane member on said body for pivotal movement about said axis such that said first surface forms a movable wall portion of said throat section and such that said vane member is selectively rotatable about its pivotal axis to an angular position at which said first surface engages said stationary wall portion of said throat section to close said passageway; and
controllably varying the angular position of said vane member relative to said body;
thereby to selectively vary the orifice area of said throat section.

11. The method as set forth in claim 10, and further comprising the additional step of:
controllably varying the thrust vector of fluid flowing through said passageway.

12. The method as set forth in claim 10, and further comprising the additional step of:
selectively varying the centerline of said nozzle as a function of the angular position of said vane member.

* * * * *